United States Patent
Lee et al.

(10) Patent No.: US 9,449,162 B2
(45) Date of Patent: Sep. 20, 2016

(54) PORTABLE STORAGE DEVICE USING FINGERPRINT RECOGNITION, AND CONTROL METHOD THEREOF

(71) Applicant: BEFS CO., LTD., Seoul (KR)

(72) Inventors: Seung Jin Lee, Yongin-si (KR); Chang Hyeok Bang, Seoul (KR)

(73) Assignee: BEFS CO., LTD., Seoul (KR)

( * ) Notice: Subject to any disclaimer, the term of this patent is extended or adjusted under 35 U.S.C. 154(b) by 85 days.

(21) Appl. No.: 14/356,108

(22) PCT Filed: Jul. 10, 2013

(86) PCT No.: PCT/KR2013/006120
§ 371 (c)(1),
(2) Date: May 2, 2014

(87) PCT Pub. No.: WO2014/010928
PCT Pub. Date: Jan. 16, 2014

(65) Prior Publication Data
US 2014/0359758 A1    Dec. 4, 2014

(30) Foreign Application Priority Data

Jul. 13, 2012  (KR) .................. 10-2012-0076568

(51) Int. Cl.
| | |
|---|---|
| G06F 12/14 | (2006.01) |
| G06F 21/32 | (2013.01) |
| G06F 21/30 | (2013.01) |
| G06K 9/00 | (2006.01) |
| G07C 9/00 | (2006.01) |

(52) U.S. Cl.
CPC .............. *G06F 21/32* (2013.01); *G06F 21/30* (2013.01); *G06K 9/00* (2013.01); *G06K 9/00067* (2013.01); *G07C 9/00087* (2013.01); *G06K 9/00006* (2013.01); *G07C 2009/00095* (2013.01)

(58) Field of Classification Search
None
See application file for complete search history.

(56) References Cited

U.S. PATENT DOCUMENTS

| | | | | |
|---|---|---|---|---|
| 7,984,303 B1* | 7/2011 | Ma | ......................... | G06F 21/32 713/182 |
| 2002/0073340 A1* | 6/2002 | Mambakkam | .......... | G06F 21/80 726/2 |
| 2005/0097338 A1* | 5/2005 | Lee | ......................... | G06F 21/32 713/186 |
| 2005/0197859 A1* | 9/2005 | Wilson | .................... | G06Q 50/22 705/2 |
| 2005/0244037 A1* | 11/2005 | Chiu | ....................... | G06F 21/32 382/124 |

(Continued)

FOREIGN PATENT DOCUMENTS

| | | |
|---|---|---|
| JP | 2008-225661 A | 9/2008 |
| KR | 2002-0004368 A | 1/2002 |

(Continued)

*Primary Examiner* — Fatoumata Traore
(74) *Attorney, Agent, or Firm* — Novick, Kim & Lee, PLLC; Jae Youn Kim (57) ABSTRACT

Disclosed is a portable storage device including a fingerprint sensor, a fingerprint data processing unit, a data repository, a data processing unit and the like. The fingerprint data processing unit outputs a fingerprint matching signal when fingerprint information received from the fingerprint sensor matches authentication fingerprint information of the fingerprint data repository. If the fingerprint matching signal is received from the fingerprint data processing unit, the data processing unit retrieves a data requested by the user terminal from the data repository, converts the retrieved data into a read-only data and transmits the read-only data to the user terminal.

5 Claims, 5 Drawing Sheets

(56) References Cited

U.S. PATENT DOCUMENTS

| | | | |
|---|---|---|---|
| 2008/0126810 A1* | 5/2008 | Chiu | G06F 21/80 713/186 |
| 2011/0072264 A1* | 3/2011 | McNulty | G06F 21/32 713/168 |
| 2011/0314304 A1* | 12/2011 | Braams | G06F 21/79 713/193 |
| 2012/0254967 A1* | 10/2012 | Braun | G06F 21/32 726/7 |

FOREIGN PATENT DOCUMENTS

| KR | 10-2005-0034506 A | 4/2005 |
|---|---|---|
| KR | 10-0606393 B1 | 7/2006 |

* cited by examiner

PORTABLE STORAGE DEVICE USING FINGERPRINT RECOGNITION, AND CONTROL METHOD THEREOF

TECHNICAL FIELD

The present invention relates to a portable storage device having a security function and a control method thereof, and more specifically, to a device for controlling access to a security area within the portable storage device by adding a fingerprint recognition function in the portable storage device, and a control method thereof.

BACKGROUND ART

Portable storage devices such USB memory, a memory stick, an SD memory card, an external hard disk and the like are widely used in a computer, a cellular phone, a camera or the like.

Although such a portable storage device stores private information such as a security certificate or the like in many cases, the private information is easy to be leaked out by loss or the like of the device, and thus security setting is particularly required. Generally, the security setting is accomplished in a method of individually setting a password for a data or using separate security software.

Security process on a data is accomplished through encryption and decryption, and a secret key cryptographic algorithm and a public key cryptographic algorithm are widely used for the security process. The secret key cryptographic algorithm is a method of using the same key for encryption and decryption, and a transmitter and a receiver should safely exchange the key before performing a secure communication. A public key cryptographic algorithm is developed to relieve such an inconvenience. However, since the public key cryptographic algorithm takes a long processing time and its implementation is complicated, the secret key cryptographic algorithm attracts attention again in recent days when encryption speed is gradually considered as being important.

Although a method using a password is widely used as an authentication method in the security setting, this is unsafe since the password can be lost or exposed to other people, and particularly, it needs to further strengthen security of a portable storage device having excellent portability, such as USB memory or the like.

DISCLOSURE OF INVENTION

Technical Problem

Therefore, the present invention has been made in order to solve the security problem of a portable storage device, and an object of the present invention is to strengthen security of the portable storage device and specifically to personalize the portable storage device.

Technical Solution

A portable storage device of the present invention for accomplishing the above object includes a fingerprint sensor, a fingerprint data repository, a fingerprint data processing unit, a communication control unit, a firmware repository, a data repository and a data processing unit.

The fingerprint sensor receives fingerprint information.

The fingerprint data repository stores authentication fingerprint information which will be compared with the input fingerprint information.

The fingerprint data processing unit outputs a fingerprint matching signal if the fingerprint information received from the fingerprint sensor matches the authentication fingerprint information of the fingerprint data repository.

The communication control unit controls communication between a user terminal and the portable storage device.

The firmware repository stores firmware needed for driving the portable storage device and a management program including a read-only conversion program.

The data repository stores data which needs security.

If the fingerprint matching signal is received from the fingerprint data processing unit, the data processing unit retrieves a data requested by the user terminal from the data repository and converts the retrieved data into a read-only data. The data processing unit transmits the read-only data to the user terminal under the control of the communication control unit.

In the portable storage device of the present invention, the data repository includes a security data storage area and a restricted use area, and the firmware repository may be included in the restricted use area. The data repository may further include a general data storage area, and the sizes of the security data storage area and the general data storage area may be set using the management program.

The portable storage device of the present invention may further include an encryption/decryption engine, and the encryption/decryption engine encrypts and decrypts a data in hardware when the data is stored in and retrieved from the data repository.

The data processing unit may transmit a file list of the security data storage area to the user terminal only when a fingerprint matching signal is received from the fingerprint data processing unit.

In addition, the data processing unit may continuously confirm whether or not a data is used in the portable storage device, and if any operation is not confirmed for a predetermined time period, the data processing unit may restrict use of the data repository, and if use of the data repository is requested again from the user terminal, the data processing unit may request input of fingerprint information and perform the user authentication step.

The portable storage device of the present invention may further include an initialization button. It may be configured to perform an initialization process only when the fingerprint matching signal is received from the fingerprint data processing unit.

The portable storage device of the present invention may further include a function button for activating use of a corresponding area in order to drive the management program of the firmware repository. If the function button is pressed, the management program area of the firmware repository is activated on the user terminal in the form of a CD-ROM drive, and if the management program is executed, a user authentication process is performed, and then it is allowed to use a fingerprint registration function, a fingerprint data deletion function, a stored data format function, a password change function and the like.

A security method of a portable storage device according to the present invention includes the steps of: connecting, by the portable storage device, to a user terminal; receiving, by a fingerprint sensor, fingerprint information of a user; comparing, by a fingerprint data processing unit, the input fingerprint information with authentication fingerprint information of a fingerprint data repository and outputting a fingerprint matching signal if the fingerprint information matches the authentication fingerprint information; transmitting, by a data processing unit, a file list of a data repository to the user terminal if the fingerprint matching signal is received from fingerprint data processing unit; and converting, by the data processing unit, a specific file into a read-only file and transmitting the read-only file to the user terminal if the user terminal requests the specific file.

In addition, the security method may further include the step of continuously confirming, by the data processing unit, whether or not a data is used in the portable storage device, restricting use of the data repository if any operation is not confirmed for a predetermined time period, and requesting input of fingerprint information and performing a user authentication step if use of the data repository is requested again from the user terminal.

The security method of a portable storage device according to the present invention may further include the step of decrypting a specific file in hardware when an encryption/decryption engine retrieves the specific file from the data repository.

Advantageous Effects

The portable storage device according to the present invention may correctly recognize a user using fingerprint information as authentication information and may strengthen security since there is no fear of losing the authentication information.

DESCRIPTION OF SYMBOLS

Best Mode for Carrying Out the Invention

The present invention will be hereafter described in detail with reference to the accompanying drawings.

Figure 1:
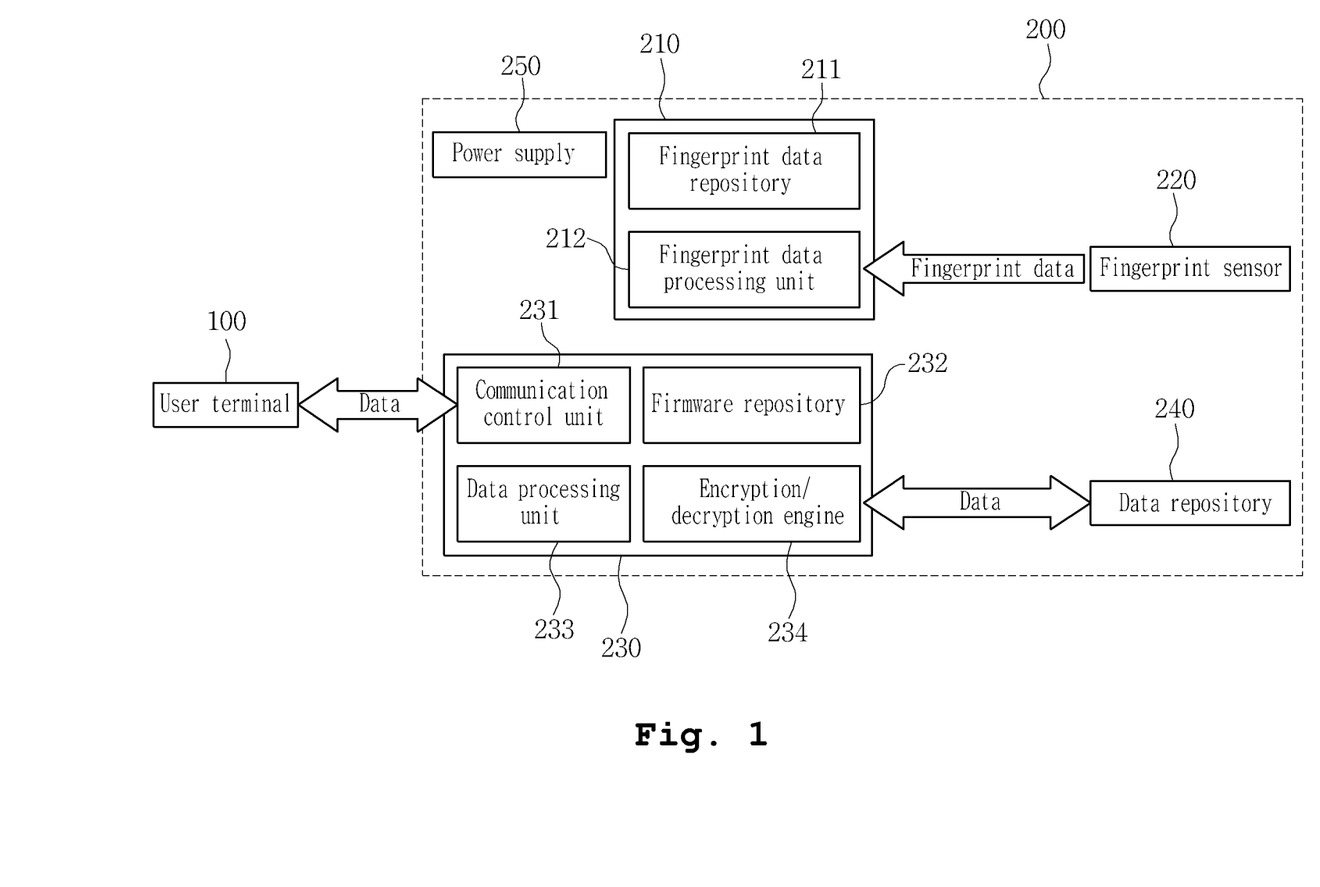
FIG. 1 is a view showing the configuration of a portable storage device according to the present invention.

FIG. 1 is a view showing the configuration of a portable storage device according to the present invention.

A user terminal 100 is a host device to which a portable storage device 200 is connected, including all kinds of devices capable of connecting and using an external storage device, such as a mobile terminal and the like, other than a computer.

The portable storage device 200 is largely configured of a fingerprint recognition module 210 and a fingerprint sensor 220 for confirming permission of a user for using fingerprint information, a data processing module 230 and a data repository 240 in charge of communication with the user terminal, an encryption process and the like, and a power supply 250 for supplying power for driving the portable storage device 200.

The fingerprint recognition module 210 includes a fingerprint data repository 211 and a fingerprint data processing unit 212, and the data processing module 230 includes a communication control unit 231, a firmware repository 232, a data processing unit 233 and an encryption/decryption engine 234.

The fingerprint data repository 211 is a storage space for storing authentication fingerprint information of a user to be compared with input fingerprint information, which is generally a physically independent storage space. However, it may be configured as a logical storage space by sharing a part of a main storage space configuring the data repository 240 in the portable storage device 200.

When the portable storage device 200 is driven for the first time or initialized or when authentication fingerprint information is not stored in the fingerprint data repository 211, a management program is executed to guide registration of the authentication fingerprint information when the portable storage device 200 is connected to the user terminal 100. In this case, the fingerprint information of a user is input and stored through the fingerprint sensor 220. Here, the fingerprint information stored in the fingerprint data repository 211 is preferably stored after being encrypted using an encryption algorithm.

In addition, several pieces of authentication fingerprint information may be stored in the fingerprint data repository 211. In this manner, even when the portable storage device 200 is shared by several people in a research group or the like, the members belonging to the group may use the portable storage device 200 using their own fingerprints. Meanwhile, if information access privilege of each person is desired to be differentiated when several people share the portable storage device, it is possible to set different security information for each authentication fingerprint information in order to individually grant the privilege and set a different security data storage area for each authentication fingerprint information so that several people may use one portable storage device 200 for a variety of purposes.

The fingerprint data processing unit 212 compares the fingerprint information received from the fingerprint sensor 220 with the authentication fingerprint information of the fingerprint data repository 211 and outputs a fingerprint matching signal if the two pieces of fingerprint information are matched. When it is requested to set authentication information by an authenticated user, the fingerprint data processing unit 212 stores the fingerprint information received from the fingerprint sensor 220 in the fingerprint data repository 211 as authentication fingerprint information. At this point, when the authentication fingerprint information is stored in the fingerprint data repository 211, an RSA algorithm or the like may be used to encrypt the authentication fingerprint information.

The fingerprint sensor 220 is a hardware device for receiving fingerprint information from a user and is constructed in a comparatively simple structure compared with other biometric information reception devices.

The fingerprint recognition method is largely divided into an optical method and a semiconductor type method. In the case of the optical method, if input light generated by a light source produces a fingerprint image through a prism, an image acquisition device receives the fingerprint image through a lens. In the semiconductor type method, a fingerprint image is acquired by directly touching the surface of a semiconductor, and this method is advantageous for mass production since it can be used for miniaturization. The fingerprint sensor 220 used in the present invention preferably uses the semiconductor type method which is advantageous for miniaturization and mass production.

The portable storage device 200 may be connected to the user terminal 100 using a variety of interfaces such as a USB, IEEE1394, E-IDE, E-SATA, SATA, SCSI, BlueTooth, WIFI, LAN and the like, and an appropriate interface is selected considering prompt data processing and convenience of use.

The communication control unit 231 controls transmission and reception of data between the portable storage device 200 and the user terminal 100 which can be connected through a variety of interface units. The communication control unit 231 may be differently processed through a communication specification of a corresponding interface according to the type of a used interface.

The firmware repository 232 stores firmware and a management program including a read-only conversion program needed for driving the portable storage device 200. The firmware is a kind of software and contains a function needed for driving a microcontroller, which is generally called as a micom, and is recorded in ROM, flash memory or the like. The firmware repository 232 stores programs needed for managing the portable storage device 200, for example, programs for setting authentication fingerprint information, setting a security data storage area and a general data storage area, setting security, and initializing the portable storage device 200, in addition to the firmware.

The firmware repository 232 may be a physically independent storage space, or it can be configured as a logical storage space at a part of a main storage space configuring the data repository 240 of the portable storage device 200. It is also possible to separately configure a space for storing the firmware and a space for storing the management program.

The portable storage device 200 management program stored in the firmware repository 232 is activated in the form of a CD-ROM area on the user terminal 100 so that a user may use the program, and it preferable that the management program functions only when user authentication is succeeded using fingerprint information or a password for security. It is also possible that the firmware repository 232 area is not shown on the user terminal 100 at normal times, and a corresponding area is activated in the form of a CD-ROM area only when a specific function button is pressed.

The data processing unit 233 transmits and receives data between the user terminal 100 and the data repository 240. The data processing unit 233 receives a result of comparing an input fingerprint of the fingerprint sensor 220 and the authentication fingerprint information from the fingerprint data processing unit 212. If a fingerprint matching signal is received, the data processing unit 233 retrieves a data requested by the user terminal 100 from the data repository 240 and converts the retrieved data into a read-only data. The data processing unit 233 transmits the read-only data to the user terminal 100 under the control of the communication control unit 231.

The encryption/decryption engine 234 processes encryption and decryption in hardware when a security data is stored. It may use a symmetric key encryption algorithm such as Data Encryption Standard (DES), Triple Data Encryption Standard (3DES), Message Digest 5 (MD5), Advanced Encryption Standard (AES), SEED or the like, and although it is preferable to use a method such as AES, SEED or the like, which is a standard encryption algorithm, it is possible to strengthen security by combining a plurality of encryption techniques.

Hardware information such as a product ID, a memory ID or the like may be used as an encryption key. The product ID and the memory ID are a serial number assigned to each chip when a semiconductor chip is manufactured or a unique ID configured of the serial number and characters, and since the IDs can be only read and cannot be updated, they are appropriate to be used as a unique encryption key. However, other kinds of information may also be used as an encryption key.

The data repository 240 is a space for storing data which needs security and includes a security data storage area and a restricted use area, and the firmware repository 232 may be included in a restricted use area. The data repository 240 may further include a general data storage area, and the sizes of the security data storage area and the general data storage area may be set using the management program.

The data repository 240 includes all kinds of media capable of recording data, such as flash memory, a hard disk and the like.

The power supply 250 receives power from an interface or a separate independent power supply and supplies a driving power to the portable storage device 200. Although an interface such as a USB, IEEE1394, E-SATA or the like supplies power through the interface itself, since power needed for driving each of hardware elements of the portable storage device 200 may be different in voltage, a power supplied from outside needs to be changed or adjusted to a driving voltage of the portable storage device 200. Usually, a regulator is used to lower the voltage, and a DC-DC converter is used to boost the voltage.

In addition, the portable storage device 200 may further include an initialization button for initializing the state of the portable storage device 20 to a shipping state. The initialization process performed by the initialization button is preferably progressed only when a fingerprint matching signal is received from the fingerprint data processing unit 212.

Figure 2:
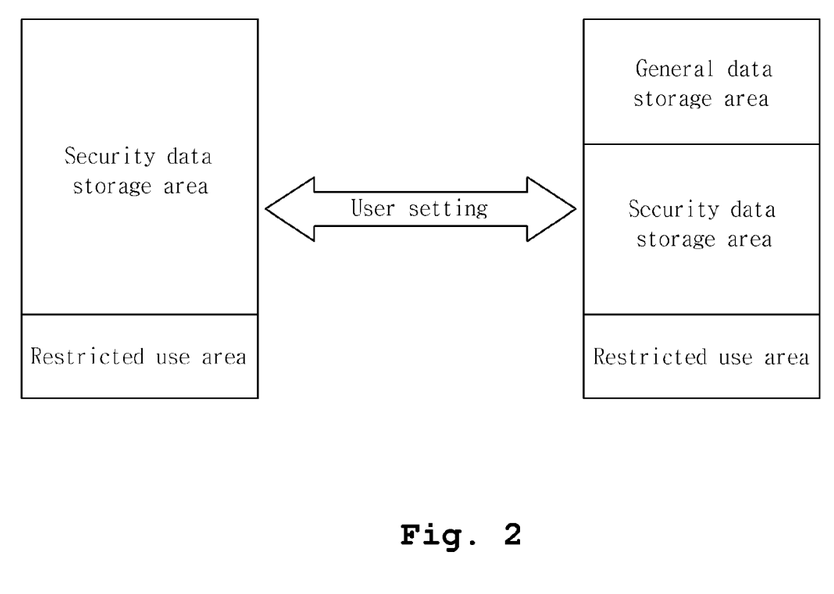
FIG. 2 is an exemplar view showing data storage areas of a portable storage device according to the present invention.

FIG. 2 is an exemplar view showing data storage areas of a portable storage device according to the present invention.

In the example shown in FIG. 2, in the form of combining a management program storage unit of the firmware repository 232 with the data repository 240, the firmware repository 232 storing the management program and the like is fixed as a restricted use area, and the other area except the restricted use area is configured of a security data storage area and a general data storage area. The restricted use area is a read-only space like CD-ROM, and the security data storage area may be seen and accessed by the user terminal 100 only when the privilege of a user is confirmed through fingerprint recognition or the like. The size of the general data storage area may be set using the management program.

Figure 3:
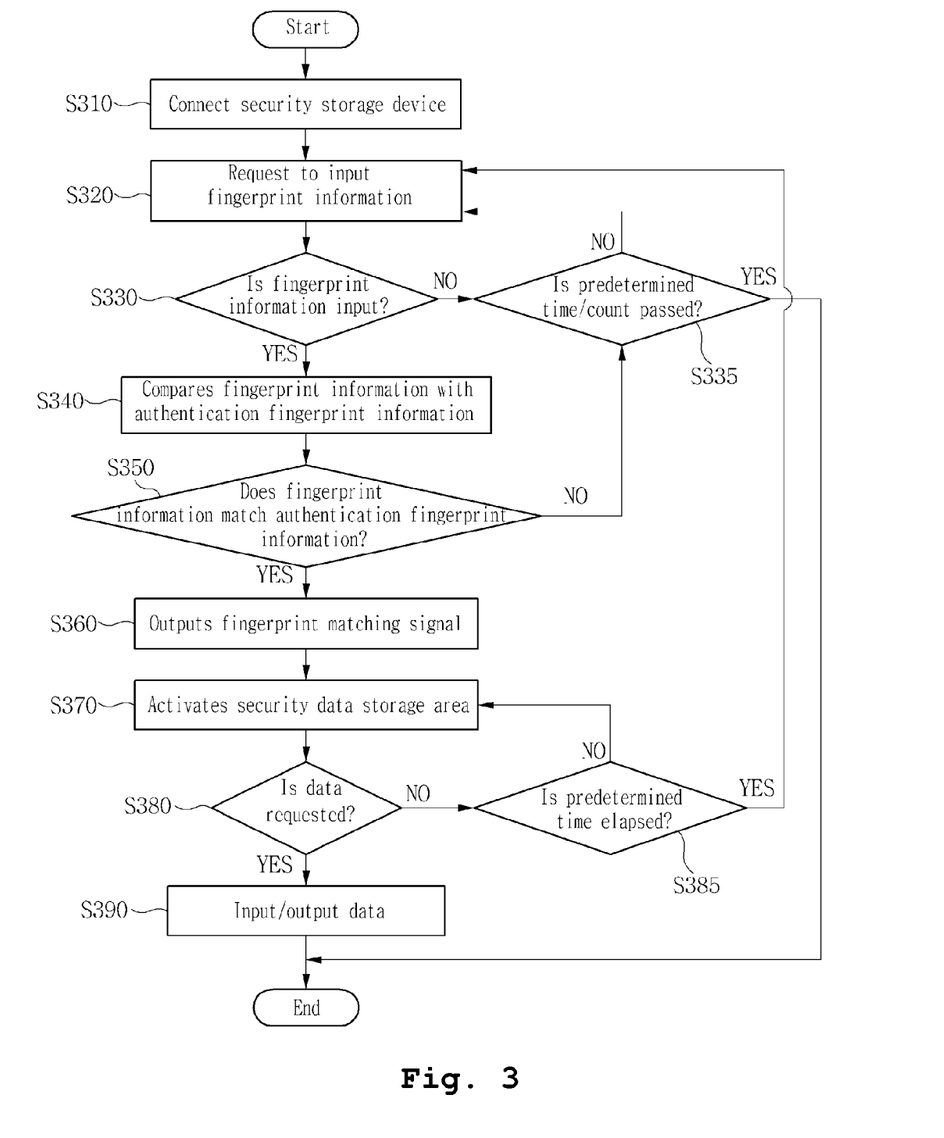
FIG. 3 is a flowchart illustrating a control method of a portable storage device according to the present invention.

FIG. 3 is a flowchart illustrating a control method of a portable storage device according to the present invention.

If the portable storage device 200 having a security function is connected to the user terminal 100 S310, the portable storage device 200 requests the user terminal 100 to input fingerprint information S320. If the fingerprint information of a user is input through the fingerprint sensor 220 S330, the fingerprint data processing unit 212 compares the input fingerprint information with authentication fingerprint information of the fingerprint data repository 211 S340, and if the input fingerprint information matches the authentication fingerprint information, the fingerprint data processing unit 212 outputs a fingerprint matching signal S350 and S360. If the fingerprint information input from the user terminal 100 does not match the authentication fingerprint information, the fingerprint data processing unit 212 requests the user terminal to input the fingerprint information again S320. However, if a predetermined time is elapsed without an input or the input fingerprint information does not match the authentication fingerprint information more than a predetermined number of times, the user authentication process is terminated, and use of the portable storage device 200 may be restricted.

When the user is authenticated, this fact may be informed by displaying a guidance message on the user terminal 100. In this case, an LED or the like may be added to the portable storage device 200 so that the user may recognize an operation state such as success of authentication or the like.

If user authentication is succeeded, the data processing module 230 activates the security data storage area of the data repository 240 and transmits a file list of the security data storage area to the user terminal 100 S370. At this point, the restricted use area is also displayed on the user terminal 100 together with the security data storage area so that the management program may be used, and it is also possible that the restricted use area is not shown on the user terminal 100 at normal times, and a corresponding area is activated in the form of a CD-ROM area only when a specific function button is pressed. The user may use a fingerprint registration function, a fingerprint data deletion function, a stored data format function, a password change function and the like using the management program.

If a signal which requests a data read or write operation is received from the user terminal 100 S380, the data processing unit 233 performs an input/output function on a corresponding data S390.

At this point, when a specific file is retrieved from the data repository, the encryption/decryption engine 234 may process decryption of the specific file in hardware.

In addition, the data processing unit 233 continuously confirms whether or not a data is used in the portable storage device 200, and if any operation is not confirmed for a predetermined time period, the data processing unit 233 restricts use of the data repository, and if use of the data repository is requested again from the user terminal 100, the data processing unit 233 requests input of fingerprint information and performs the user authentication step S385.

Figure 4:
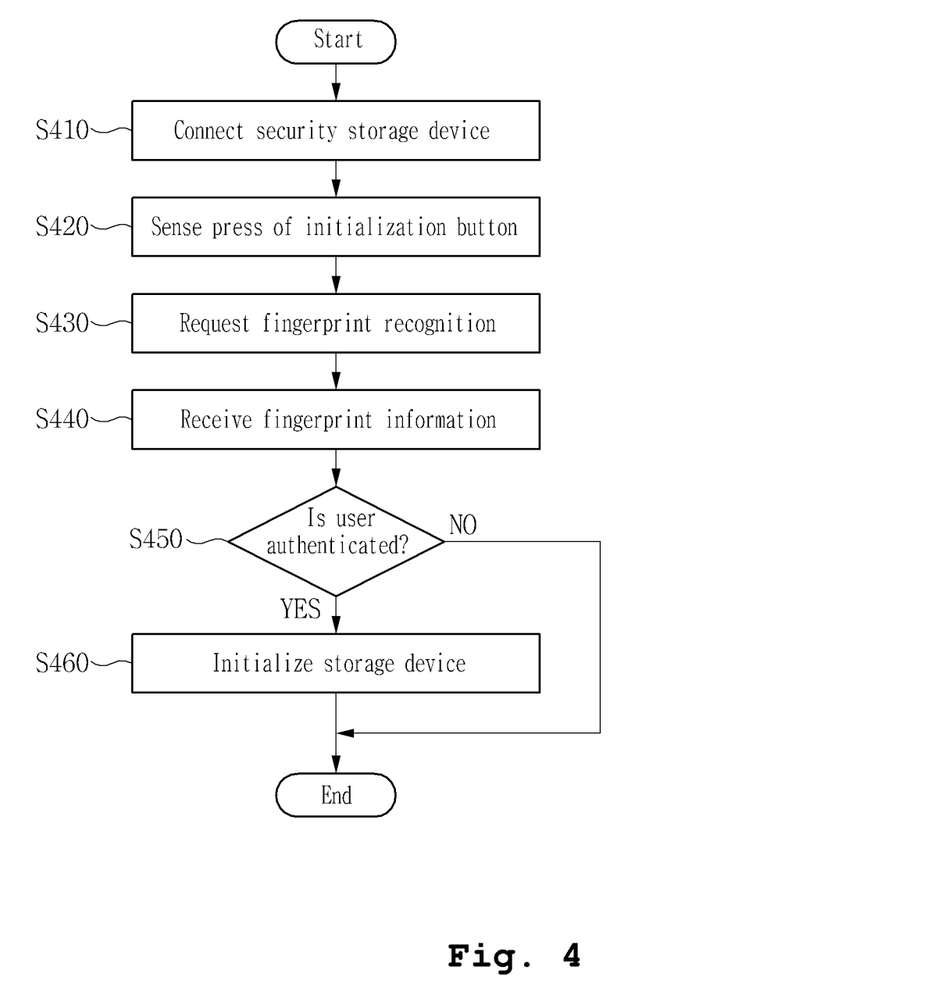
FIG. 4 is a flowchart illustrating a control method performed when an initialization button of a portable storage device is pressed according to the present invention.

FIG. 4 is a flowchart illustrating a control method performed when an initialization button of a portable storage device is pressed according to the present invention.

The portable storage device 200 may initialize the state of the portable storage device 200 to a shipping state using an initialization button. For the initialization, first, the portable storage device 200 having a security function is connected to the user terminal 100 S410, and if an input from the initialization button of the portable storage device 200 is sensed S420, a message directing to recognize a fingerprint is displayed on the monitor of the user terminal 100 S430. If fingerprint information of a user is input through the fingerprint sensor 220 S440, the fingerprint data processing unit 212 determines whether or not the input fingerprint information matches authentication fingerprint information by comparing the fingerprint information with the authentication fingerprint information S450.

If the user is not authenticated, the initialization command is ignored, and if the user is authenticated, the state of the portable storage device 200 is initialized to the shipping state S460.

Figure 5:
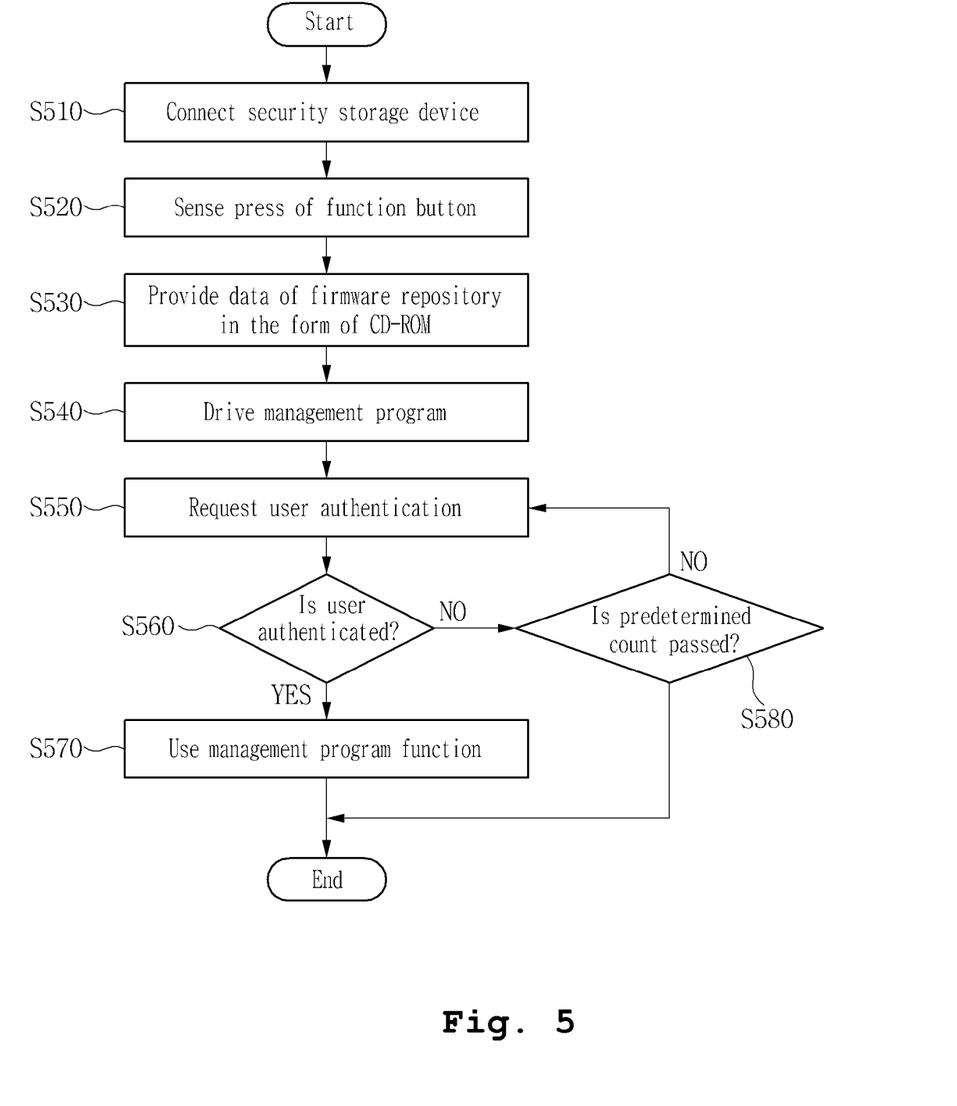
FIG. 5 is a flowchart illustrating a control method performed when a function button of a portable storage device is pressed according to the present invention.

FIG. 5 is a flowchart illustrating a control method performed when a function button of a portable storage device is pressed according to the present invention.

The portable storage device 200 may further include a function button for activating use of a corresponding area in order to drive the management program of the firmware repository 232. If the portable storage device 200 is connected the user terminal 100 S510 and an input from the function button of the portable storage device 200 is sensed S520, the management program area of the firmware repository 232 is activated on the user terminal 100 in the form of a CD-ROM drive S530. If the management program is driven S540, user authentication using a password or fingerprint recognition is requested S550, and if the user authentication is succeeded S560, it is allowed to use a fingerprint registration function, a fingerprint data deletion function, a stored data format function, a password change function and the like using the management program S570. If the user authentication is failed, authentication of the user is requested again, and if the user authentication is failed more than a predetermined number of times, it is preferable to terminate the user authentication process and prohibit use of the management program S580.

The portable storage device of the present invention and the elements configuring a control method thereof may be implemented in an independent or combined form inside one chip, and its shape is not restricted to a specific form. Although the present invention has been described based on the embodiments, this is merely an example of the present invention, and it is not to restrict the present invention. In addition, those skilled in the art can make various modifications and changes thereto based on the embodiments. Therefore, the scope of the present invention should be defined by the appended claims, and the modifications and changes made by those skilled in the art may be construed to be included within scope of the present invention.

The invention claimed is:

1. A portable storage device using fingerprint recognition, the device comprising:
   a fingerprint sensor for receiving fingerprint information;
   a fingerprint data repository for storing authentication fingerprint information;
   a fingerprint data processing unit for outputting a fingerprint matching signal when the fingerprint information received from the fingerprint sensor matches the authentication fingerprint information of the fingerprint data repository;
   a communication control unit for controlling communication with a user terminal;
   a firmware repository for storing firmware and a management program including a read-only conversion program for driving the portable storage device;
   a data repository for storing data;
   a data processing unit for retrieving a data requested by the user terminal from the data repository, converting the retrieved data into a read-only data, and transmitting the read-only data to the user terminal under the control of the communication control unit, if the fingerprint matching signal is received from the fingerprint data processing unit;
   a function button for providing a firmware repository area to the user terminal in a form of CD-ROM and allowing the management program in the firmware repository area to be used when user authentication is succeeded;
   an encryption/decryption engine for encrypting and decrypting a data in hardware when the data is stored in and retrieved from the data repository; and
   an initialization button,
   wherein an initialization process performed by the initialization button is performed only when the data processing unit receives the fingerprint matching signal from the fingerprint data processing unit, and wherein the data processing unit transmits a file list of the security data storage area to the user terminal only when the fingerprint matching signal is received from the fingerprint data processing unit.

2. The device according to claim 1, wherein if any operation is not confirmed for a predetermined time period, the data processing unit restricts use of the data repository and requests the user terminal to input fingerprint information.

3. The device according to claim 1, wherein the fingerprint data repository includes a plurality of pieces of authentication fingerprint information for a plurality of users, wherein each user has a different information access privilege to access the portable storage device, wherein different security information for each authentication fingerprint information is set in order to individually grant the privilege and set a different security data storage area for each authentication fingerprint information.

4. The device according to claim 1, wherein the firmware repository area is shown on the user terminal and activated in the form of CD-ROM when the function button is pressed.

5. The device according to claim 1, when the user authentication is succeeded, the security data storage area and the restricted use area are displayed on the user terminal to use the management program, wherein the restricted use area displayed on the user terminal is activated in the form of CD-ROM when the function button is pressed, and wherein the management program performs at least one of a fingerprint registration function, a fingerprint data deletion function, a stored data format function and a password change function.

* * * * *